United States Patent [19]

Burkowski et al.

[11] Patent Number: 4,991,087
[45] Date of Patent: Feb. 5, 1991

[54] METHOD OF USING SIGNATURE SUBSETS FOR INDEXING A TEXTUAL DATABASE

[76] Inventors: Forbes J. Burkowski, 65 Margaret Avenue South, Waterloo, Ontario, Canada, N2J 2C8; Marke S. Krebs, 46 Garnet Avenue, Toronto, Ontario, Canada, M6G 1V5

[21] Appl. No.: 233,601

[22] Filed: Aug. 18, 1988

[30] Foreign Application Priority Data

Aug. 19, 1987 [GB] United Kingdom ............... 8719572

[51] Int. Cl.⁵ .......................................... G06F 15/40
[52] U.S. Cl. ............................. 364/200; 364/282.1; 364/283.1
[58] Field of Search ... 364/200 MS File, 900 MS File, 364/300; 371/22.3

[56] References Cited

U.S. PATENT DOCUMENTS

| | | | |
|---|---|---|---|
| 4,068,301 | 1/1978 | Ishino et al. | 364/200 |
| 4,085,446 | 4/1978 | Nagamura | 364/900 |
| 4,255,796 | 3/1981 | Gabbe et al. | 364/900 |
| 4,318,184 | 3/1982 | Millett et al. | 364/900 |
| 4,358,824 | 9/1982 | Glickman et al. | 364/200 |
| 4,554,631 | 9/1985 | Reddington | 364/300 |

*Primary Examiner*—Raulfe B. Zache
*Attorney, Agent, or Firm*—Daryl W. Schnurr

[57] ABSTRACT

A method of operating a computer system to store and retrieve information in a database uses a signature file of the database that is divided into subsets. A word signature is mapped to a particular subset during creation of the file and the same mapping information is used to retrieve the information in response to a query word. Each word signature is a logical word signature and has two components a physical word signature and a subset designation field. In this way, when information is retrieved from the database, only that subset containing the relevant word signature is scanned. The signature file is automatically created by the system as the database is stored on the data storage modules. During retrieval, the control reviews information received from the data storage means and if a match occurs between a physical word signature for a query word and a particular physical word signature arriving from the input section, the control sends the physical word signature to the FIFO buffer in memory together with the document identifier located subsequent to the matched physical word signature. The control then moves on to process the next physical word signature received from the data storage means. If there is no match, the control ignores the physical word signature and moves on to process the next physical word signature received from the data storage means. The control is effectively capable of processing several query words in parallel.

14 Claims, 4 Drawing Sheets

METHOD OF USING SIGNATURE SUBSETS FOR INDEXING A TEXTUAL DATABASE

BACKGROUND OF THE INVENTION

1. Field of the Invention

This invention relates to a data retrieval system and, in particular, to a method of storing data on and retrieving data from a database using a signature file that is divided into subsets, the signature file being automatically created as the data is stored.

2. Description of the Prior Art

Data storage and retrieval systems are known. With the creation of larger and larger databases and the increased use thereof, it is becoming increasingly important to have an accurate method of storing and retrieving the data in a minimum amount of time. It is also important to be able to add information to an existing database without making extensive amendments to the existing information.

In many known databases, the information is highly organized as a carefully indexed structure resident on a storage medium such as a disk. When a portion of the data is to be retrieved, the system makes use of this indexing information in order to locate the required data which may be embedded in a huge collection of similar data items. Indexing information is stored in an extra file. There are various ways of establishing said index. One possible approach is the use of a signature file, the other is the use of an inverted file. The latter approach is often used since it provides fast retrieval but it has two significant shortcomings:

(a) the size of an inverted file is extremely large, being 20% to 100% of the size of the text file itself;

(b) when new data is to be entered into the database, the inverted file must be changed and the highly structured nature of the file makes modification of said file a very time consuming process since significant portions of the file must be altered.

While signature files provide extremely fast update capabilities, they are usually not the index strategy of choice since the retrieval time can be very slow. The slow retrieval time is caused by the scanning of the entire signature file and this is a very time consuming endeavour because the required transfer time from the disk will usually be of a very lengthy duration. The invention to be described uses signature files but with a strategy that make them very competitive with the inverted file approach. Rather than scanning the entire file, a subset of it is scanned instead. This will significantly lower the access time and if the system is carefully designed the modification time is still kept fairly low.

Of course, data can always be retrieved by scanning the entire database (avoiding the use of index files) but that is extremely time consuming and therefore prohibitively expensive.

When the data storage device is a write once optical disk, an update problem occurs with this technology as it is impossible to write information onto a particular area of the optical disk more than once. Therefore, new information that would normally fit adjacent to existing information cannot be placed near that information as there is no space for it at the desired location on the optical disk. Consequently, an index structure such as an inverted file cannot be changed due to this non-erasable attribute of the storage medium. It is possible to simply create a new file in a new area of the disk but this strategy is very inefficient due to the extreme waste of disk space.

When signature files are used, new information added to the database causes the signature file to increase in size since new entries are appended to the file. Since the existing information in the signature file is not changed the use of these files is of considerable advantage in the optical disk environment.

In many cases, the system responds to a user query by retrieving one or more documents that contain one or more words that the user has specified within that query. To accomplish this, indexing facilities are used to specify the locations of required information in the database. By issuing a list of document identifiers which serve to locate the documents that contain these keywords, the index facilities working in conjunction with the query resolution software determines a final list of documents satisfying the needs of the query.

The use of signature files to locate data in a database is a known strategy. A signature file is a condensation of the information in the database. This is accomplished by representing each distinct word in a document of the database with a word signature. When the system is presented with a particular query word, it will derive the word signature that has been associated with that database word. These types of systems then cause the entire signature file to be searched using a serial scan strategy and, subsequently, based on the results of that search, all documents in the database containing the word can be found. This occurs because any word signature in the signature file is followed by a document identifier for the document that contains the word from which the word signature was derived. Consequently, when a word signature in the signature file matches the word signature derived from the query word, during the scan process, the system will capture the accompanying document identifier in order to retain the identity of documents that are pertinent to the query. These systems can still be very time consuming if the entire signature file is searched for each query word.

Optical disks are the most economical means to store databases. However, seek times for an optical disk are typically four to more than thirty times as long as the seek time for a magnetic hard disk. When databases are searched using the inverted file approach, the system may undertake several probes of the index structure with each probe possibly requiring a disk seek or disk arm movement. When a more expensive magnetic hard disk is used, the time requirements are tolerable but can become extremely undesirable when using an optical disk.

SUMMARY OF THE INVENTION

It is an object of the present invention to provide a relatively fast method of data storage and retrieval whereby only a single probe into the signature file is necessary and only part of the signature file is searched in response to a particular query keyword.

In accordance with the present invention, a method of operating a computer system to store and retrieve information in a database wherein the computer system has data processing capability, memory and data storage modules capable of containing data records is as follows:

(a) storing the database on the data storage modules;

(b) during loading, said system automatically creating for the database a signature file which is divided into subsets, mapping a word signature to a particular subset during creation of the file and storing said signature file subsets on said data storage modules;

(c) during retrieval, after the signature file is created, entering at least one query word into the system;

(d) said system automatically creating a signature for each query word entered into the system;

(e) scanning for a word signature and retrieving the corresponding data from said database in response to a query word by using the same mapping information that was used to store the word signature in a particular subset, said system matching the signature of a query word with at least one word signature in one subset of said signature word if such an appropriate word signature exists in this subset.

DESCRIPTION OF A PREFERRED EMBODIMENT

Figure 1:
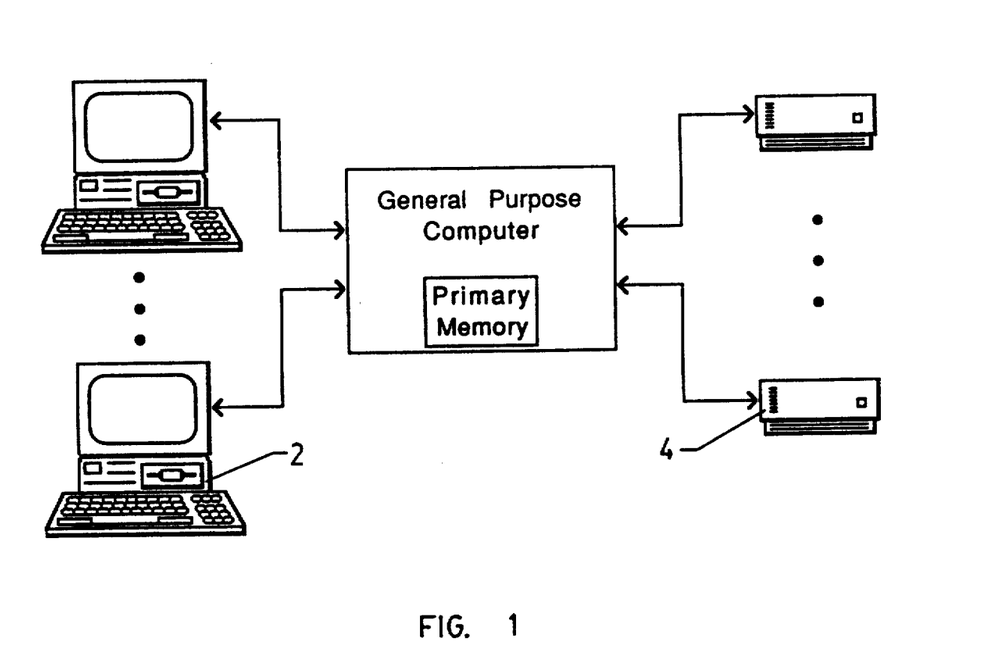
FIG. 1 is a diagram of a prior art hardware equipment assemblage with which the present invention can be used.

From FIG. 1, it can be seen that a data storage and retrieval system in accordance with the present invention is designed so that it can be accessed by a number of users simultaneously through user terminals 2, each user searching for different data and using different query words. The system also has a plurality of or data storage modules 4 on which the database is stored and from which the data can be retrieved.

Once the word signatures of the query words are detected in the signature file of the database, the identifiers of all documents containing the corresponding words are collected as a list of candidate documents. If desired, the software can be designed to process this list to determine whether or not a particular document satisfies additional requirements of a query. The user is then informed of the presence of the documents and may retrieve the actual documents for examination if desired.

A signature file is automatically created from the database, and is subsequently stored on the data storage device or optical disk. The signature file contains a sequence of integers (bit strings of fixed length), each integer representing the physical word signature of a significant word contained in the main text of the database. When the signature file for a particular document is automatically created, two steps are followed:

1. Common words are removed using a list of stop words;

2. A logical word signature is computed for each distinct remaining word in the document. This computation maps words (character strings) onto integer values that are m bits long, where m is an integer ranging from 8 to 32. Preferably, each logical word signature is generated so that it has two components, an n-bit physical word signature concatenated to a subset designation field, which selects one of several subsets, where n ranges from 8 to 20;

Stop words are words that generally do not contribute to the processes that serve to discriminate one document from another when the requirements of the query are to be met. They are often connecting words or common articles. For example, common words are "a", "the", "when", "where", "henceforth", etc. A list of stop words is loaded onto the system and the system automatically overlooks the stop words and does not create a word signature for them.

Figure 2:
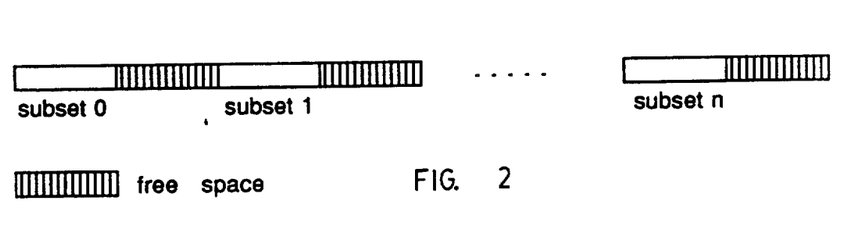
FIG. 2 is a drawing of an index structure showing three space extents after each subset.
Figure 3:
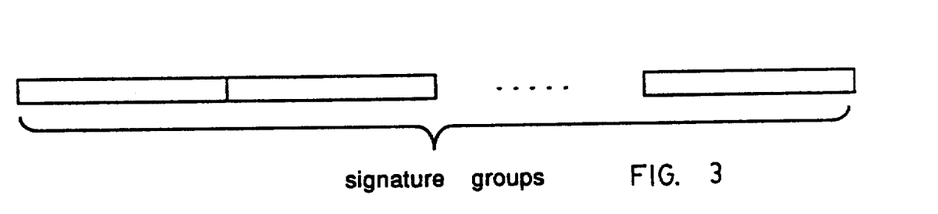
FIG. 3 is a drawing showing that a subset is comprised of many signature groups.
Figure 4:
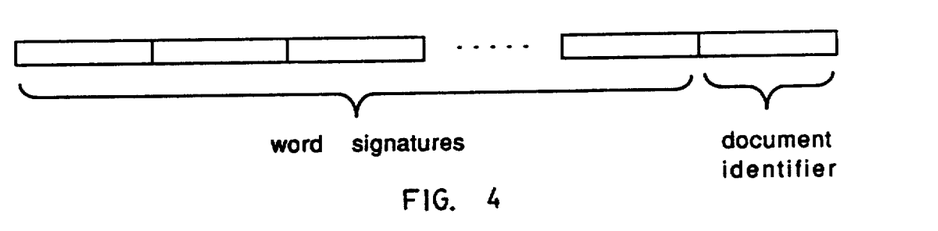
FIG. 4 is a drawing of a signature group having a document identifier following each word signature.

As shown in FIG. 2, each signature file subset, when automatically created during a database load, is a series of document signature groups appearing in the same order as the corresponding text documents (see FIG. 4). Each document signature group is comprised of a series of word signatures derived from the words in the same corresponding text document. The final entry in the signature group for one document is a representation of the identifier of that document (see FIG. 4). When a user query is to be satisfied, query words from the user query are converted into logical signatures and the signature file is scanned for matching physical word signatures. Whenever a match occurs, a representation of a document identifier at the end of the group is extracted so that the corresponding text document can be eventually located. Of course, if an appropriate word signature does not exist in any subset, then no match will occur.

It is possible to generate logical word signatures by using a hash function. This has the advantage of a fast generation and very little memory usage. However there is a drawback: since the hash encoding for a particular word signature is not guaranteed to be a one to one mapping, it is possible that different words map to the same logical word signature. During a scan operation, this multiple map can produce a false drop and an unrelated document of no interest to the user may be retrieved. This can be detected and rectified by having software check documents before they are passed to the user. False drops can be made to occur very infrequently if word signatures are long enough. The signature file can be created by using a hash function that maps words onto integer values formed from a number of bits, and creating representations of the document identifiers that are used to derive pointers to the documents.

Word signatures are usually significantly shorter than the individual text words that they represent. Also, as common words and duplicate signatures are eliminated, the signature file is much smaller than the database from which it is derived. Typically, the length of the signature file is roughly 5% to 60% of the length of the database. If the signature file contains a provision that produces related terms or synonyms that are placed in an abstract prior to the start of a document, the signature file will be somewhat enlarged.

If additional documents are appended to the database, the signature file is similarly extended by appending to the signature file additional word signatures in the form of document signature groups. The fact that the signature file can be easily updated is a distinct advantage to be gained by the use of signature files.

While the scanning of a signature file is much faster than the scanning of the entire database, even the scanning of the signature file can be fairly time consuming, particularly when the data storage device is an optical disk. For example, if a database has a size of 700 megabytes, the signature file will have a size of approximately 35 megabytes. The data streams into the data processing means from the disk at a typical rate of one megabyte per second so any scan of the signature file will take at least 35 seconds.

In order to minimize the scan time for an optical disk while retaining the advantage of an easy update, the signature file is subdivided into a reasonably large number of subsets, (for example, 256 or more subsets). During the creation of the signature file, a word signature is mapped to a particular subset and the same mapping information is used when the subset is scanned for the word signature in response to a query word.

Various word signature formats are possible. The following format will serve as an example: 15 bit physical word signatures are stored in two consecutive bytes on a disk with the most significant bit used as a steering bit, one setting of this bit will signify that this 16-bit word contains a physical word signature while the complementary setting will signify that this 16-bit word serves in the indentification of the document.

Scan time will be considerably reduced since, in response to a query word, it is only necessary to scan a small fraction of the total signature file. Subdivision of the signature file will lead to more total space consumption for the file when compared to signature files that are not subdivided. Since the group of all word signatures for a document is now dispersed across several subsets, a document identifier is needed in every subset that contains a portion of that total group.

If we assume that each two byte word signature is followed by a two byte document pointer, then a word signature, in this worst case, will occupy four bytes. When the signature file is not subdivided, each entry is typically a 24 bit signature that occupies three bytes, excluding document numbers. Thus, the total size of a signature file that has been divided into subsets is no more than one-third larger than a non-subdivided signature file.

If a 700 megabytes, using the example described earlier, the size of the signature file after being subdivided will be an additional 33% or 99.3 megabytes in all. When this subdivided file is spread over 256 subsets, each subset will have an average size of approximately 0.36 megabytes. With a transfer rate of one megabyte per second, an average subset can be transferred in 0.36 seconds.

A signature subset is scanned most effectively if no disk seek is necessary during that scan. This requires that a subset be maintained in contiguous sectors of the disk even though it will grow with the addition of new information. This is done by providing free space between the consecutive subsets as shown in FIG. 2. This free space will be gradually utilized as the database increases in size. When the data storage module is a disk, the data processing means is used to fetch one or more subsets from the disk. The processor looks for pre-specified physical word signatures.

The system helps to ensure the predictable growth of subsets by exercising some care when it decides which subset will hold a particular word signature.

When a word is first encountered in the database it is assigned to the subset which currently has the shortest length. For each subset, the processor keeps track of the highest physical word signature previously assigned. The new entry is given a word signature equal to this maximum plus one. Once the subset identifier is defined and the physical word signature is also defined, the processor will concatentate the two to form the logical word signature which can then be established in the database word dictionary. This involves a two pass scan of the text in the database. During the first pass, the system creates a list of all distinct words in the database keeping track of the number of documents that contain each word. This document count will serve to properly estimate, for each word, the total storage requirements of its word signature groups within a subset. The words are then sorted in ascending order of document counts. It is then a simple matter to assign a subset to the word signature of each word in such a way that the length of the signature subsets are as uniform as possible. This assignment is saved in the word dictionary so that during the second pass through the database, the system will compose logical signatures by concatenating the subset assignment to the physical word signature. When the association between the logical word signature and the corresponding word is retained in a keyword dictionary, the values of the subset designation fields within their logical word signatures are chosen to help in maintaining the uniform lengths of all subsets. The physical word signatures are chosen to ensure a one to one mapping between the logical word signatures and the corresponding word. The physical word signature for a word can be uniquely defined once the system knows which words are associated with a particular subset. This is done by simply numbering the distinct keywords assigned to the subset with consecutive integers. These numbers are taken to be the physical word signatures.

Depending on the application, the system could respond to the user in a variety of ways. When a particular query words is fed into the system, it is expected that the system will search only that subset containing the physical word signature matching the physical word signature of the query word. The subset will contain the document identifiers of all documents in the database that contain that query word. Using the document identifiers the documents can then be retrieved from the database without scanning the entire database.

The number of bits used in a physical word signature can range over a number of possible values depending on the requirements of the system. An n-bit physical word signature is used as an address for a RAM table with two to the power n locations, where n is an integer ranging from 8 to 20. Each location contains one bit and the subset scanning is controlled in such a fashion that it ignores word signatures when the RAM indicates a word signature is of no interest to the query. Otherwise, it places the physical word signature into the FIFO buffer.

In the following embodiment we will assume a length of 15 bits for the physical word signatures. Each 15 bit physical word signature is used as an address for a 32K by one RAM table which has contents previously defined by software running on the central processing unit (henceforth CPU). If the bit location accessed contains a binary value which indicates that this physical word signature is not being sought by this particular query, the physical word signature is ignored. If the bit location accessed contains the complementary value, then the physical word signature and the following document identifier are placed in a first in first out (FIFO)

buffer for future reference by the CPU. When a particular physical word signature is ignored, the system proceeds to examine the next physical word signature. The preferred number of bits used in the logical word signature is m-bits in length, where m ranges from 8 to 32.

In the interest of minimizing the disk space utilized by the signature file, the representations of document identifiers should occupy, on average, as little space as possible. One manner in which this can be done, during creation of the signature file, is by treating the document number as a value that is made up of three fields, a high order field labelled H, a middle order field labelled M and a low order field labelled L as follows:

Although the document numbers are not necessarily consecutive, they will occur in ascending order within a particular subset. Therefore, the H or M fields are placed into the next representation of the document identifier only when a lower order field goes through a zero value since the last representation. During a scan operation, the H field is always pushed into the FIFO buffer whenever it is encountered. When an M field appears in the stream, it is saved for future use in a register that will be called the MREG register. The group of word signatures for each document can then be terminated with a single byte containing the L field. The M field is inserted prior to an L field only if the M value has increased beyond the value associated with the previous L field. When a representation of a document identifier is to be entered into the FIFO buffer, it is combined with the last seen M field (the one that was saved in MREG). The software processing the FIFO buffer output will combine M, L pairs with the H field last seen in the stream. In this fashion, references to a document can be handled with a small space overhead that is slightly more than one byte per document group on average. While the representation of the document identifier might be an 'L field' only or an 'M and L field' only, the actual document identifier always contains all three fields.

Table 1 presents an example of encodings for bytes and words in a signature file subset. In Table 1, LSSA and HSSA represent low order and high order portions of the signature sector address, which is included at the beginning of each sector as a redundent check on the source of the word signature stream.

In more general terms, during creation of the signature file, a series of groups are generated to make up each subset. Each group has a series of physical word signatures and is terminated by a representation of a document identifier. The actual document identifier has a high, middle and low order field. The representation of the document identifier of the first group in the subset actually has a high, middle and low order field. The representations of document identifiers from subsequent groups always have a low order field but only have a middle order field or a high order field when necessary to reflect a change or changes in these fields from the document identifier represented in the immediately prior group. The document identifiers are arranged in ascending order. Thus, while the representation of the document identifier for a particular group might have a low order field only, the actual document identifier, for that group, will have a high, middle and low order field. As a variation, if there was no concern with saving space, all representations of document identifiers could actually have three fields.

TABLE 1

| Type of Subset Entry | Format | Bit Length of Entry | Action to be Taken |
|---|---|---|---|
| Word Signature |  WS = 15 bit Word Signature | 16 | Push into FIFO if a match is detected |
| Document Number L Field |  L = Bits 0, . . . , 5 of Document Number | 8 | Combine with MREG and push into FIFO if a signature in this group is detected |
| Document Number M Field |  M = Bits 6, . . . , 10 of Document Number | 8 | Save in MREG |
| Document Number H Field |  H = Bits 11, . . . , 22 of Document Number | 16 | Push into FIFO |
| Low Order Portion of Signature Sector Address |  LSSA = Bits 0, . . . , 10 of Sector Address | 16 | Push into FIFO |

TABLE 1-continued

| Type of Subset Entry | Format | Bit Length of Entry | Action to be Taken |
|---|---|---|---|
| High Order Portion of Signature Sector Address |  HSSA = Bits 11, . . . , 21 of Sector Address | 16 | Push into FIFO |

During retrieval of information from the data storage areas, the processor pushes all document identifiers having a high order field into the FIFO buffer. The processor saves the last middle order field encountered in the data stream in a register for future use. The last middle order field encountered is inserted into the FIFO along with the low order field that terminates a particular group only if the RAM has indicated a match between the physical word signature of the query word and a physical word signature in that particular group.

Figure 5:
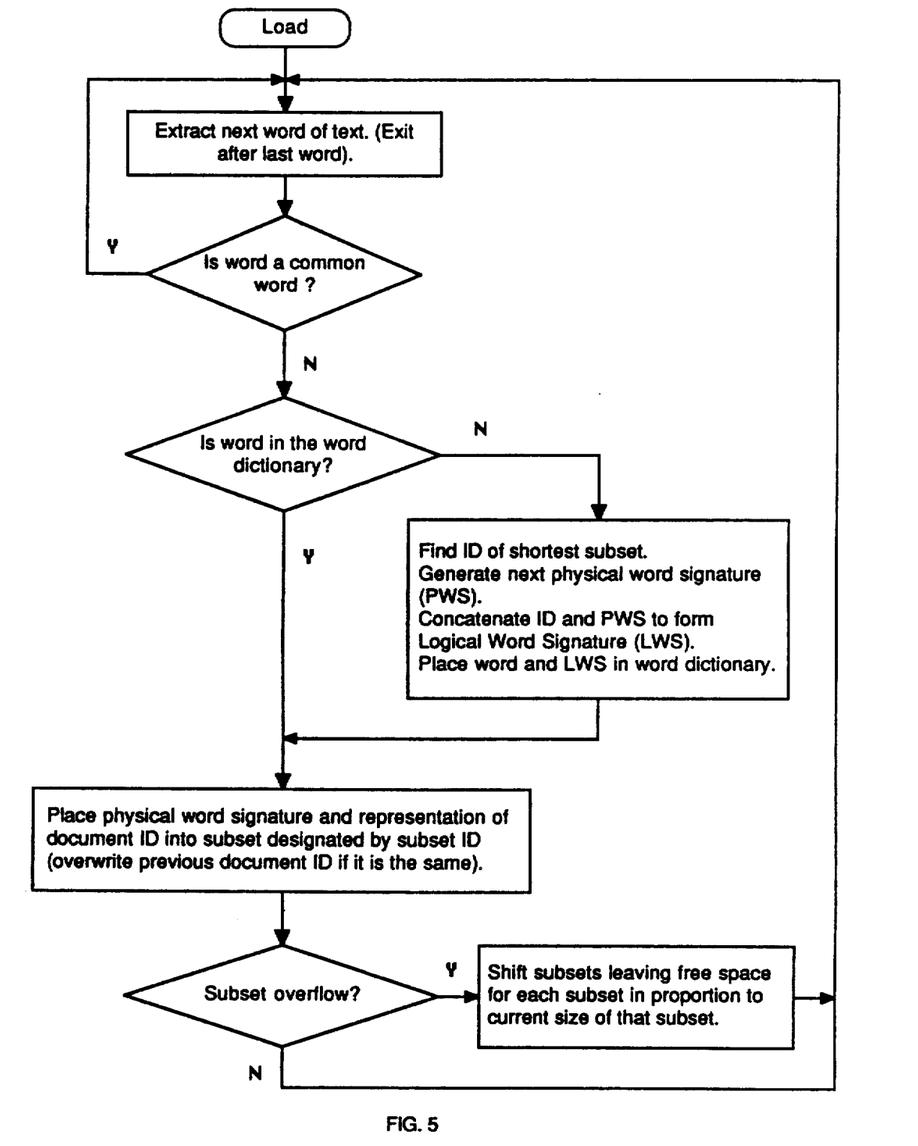
FIG. 5 is a computer programmable process flow diagram illustrating a loading method using the present invention.

In FIG. 5, there is shown a process flow diagram for loading the database. During the loading of the database, the processor automatically creates a word signature file with document identifiers, the identifiers being used for retrieving a document from the database in response to a query word. During loading, the processor, extracts each word of text and determines whether the word is a common word or not. If the word is a common word, the processor passes the word by. If the word is not a common word, the processor next determines whether the word is in the word dictionary. If the word is not in the word dictionary, the processor finds an identifier for the shortest subset. Next, the processor generates a physical word signature for the word and concatenates the identifier for the subset and the physical word signature to form a logical word signature. Then, the logical word signature is placed in the word dictionary.

If the word is already in the word dictionary, the physical word signature and a representation of the document identifier are placed into the subset designated by the subset identifier by overwriting the previous document identifier if it is the same. Next, it is determined whether the subset is filled. If not, the next word of text of the database is extracted and the process is repeated. If the subset is filled, the subsets are automatically shifted to leave free space for each subset in proportion to the current size of that subset. After the shifting occurs, the next word of the text of the database is extracted and the process is repeated.

Figure 6:
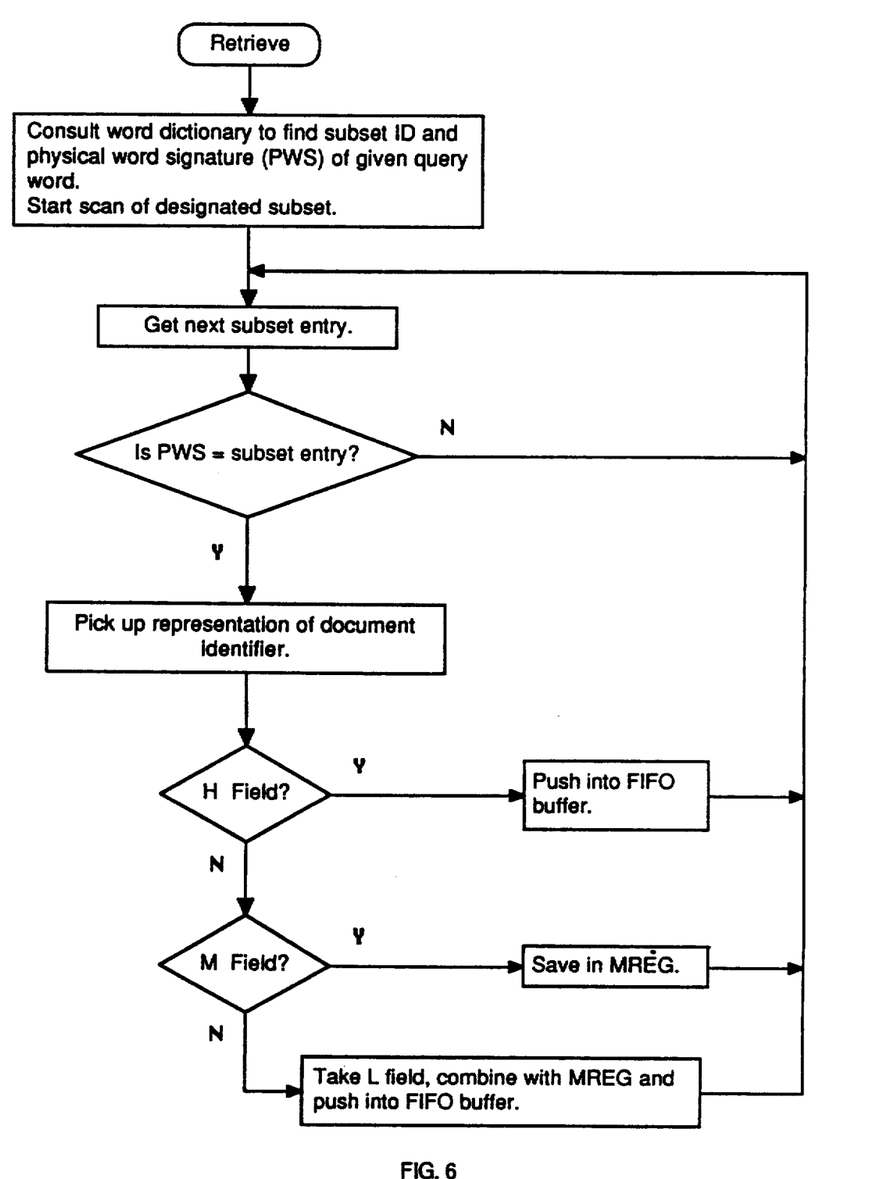
FIG. 6 is a computer programmable process flow diagram illustrating a retrieval method using the present invention.

In FIG. 6, there is shown a process flow diagram for the retrieval method. During retrieval, the processor first consults the word dictionary to find the subset identifier and physical word signature of the given query word. The processor then starts to scan the designated subset. From the first subset entry, the processor compares the subset entry to the physical word signature of the query word to determine whether or not there is a match. If there is no match, the processor moves onto the next subset entry and repeats the comparison. If there is a match, the processor picks up the representation of the document identifier. If the identifier contains an H field, this is retained for future use. If the identifier contains only the M and L fields, the full representation of the document identifier is generated by concatenating the previously saved H field to the M and L fields. Whenever an M field is part of the representation, it is saved for future use in a register called MREG. If the document identifier encountered during retrieval contains only the L field, it is combined with both of the previously saved H and M fields to obtain the full representation of the identifier. The processor then moves onto the next subset entry and the process is repeated for the entire subset.

The advantage of the method of the present invention over other existing methods such as inverted lists arises from the fast update (database append) activity that it supports. When new information is added to the database index the subsets expand into available space that is provided for this purpose. Since words share subsets the growth of a subset is dependent on the average frequency distribution of its constituent words. This property makes the growth of a subset very predictable. The method reassigns free space, when necessary to the subsets in proportion to their current size. Studies have shown that this predictable expansion promotes a uniform consumption of the free space across almost all subsets during load operations. This improves load performance because the processor does not have to spend time frequently shifting the subsets to maintain their contiguity on the disk due to any subset overflow. The method anticipates that occasionally free space is entirely used up and a subset operation is necessary. The significant improvement of this indexing technique rests on the fact that such a shift occurs only rarely and so load operations are fast since they are mainly the simple insertion of new index information.

Numerous variations, within the scope of the attached claims, will be readily apparent to those skilled in the art.

We claim:

1. A method of operating a computer system to store and retrieve information in a database, said computer system having data processing means, memory means and data storage means capable of containing data records, said method comprising the steps of:
 (a) storing the database on the data storage means;
 (b) during loading, said system automatically creating for the database a signature file which is divided into subsets, mapping a word signature to a particular subset during creation of the file and storing said signature file subsets on said data storage means;
 (c) during retrieving, after the signature file is created, entering at least one query word into the system;
 (d) said system automatically creating a signature for each query word entered into the system;
 (e) scanning for a word signature and retrieving the corresponding data from said database in response to a query word by using the same mapping information that was used to store the word signature in a particular subset, said system matching the signature of a query word with at least one signature in one subset of said signature file if such an appropriate word signature exists in this subset.

2. A method as claimed in claim 1 comprising the steps of, when matching a word signature in rsponse to a query word, having the system scan only that subset of the signature file containing a physical word signature that matches a signature for the query word.

3. A method as claimed in claim 2 comprising the steps of, during creation of the signature file for a particular document, automatically ignoring all common words in said document, automatically computing a logical word signature for each remaining word in the document and, automatically eliminating any duplicate logical word signatures in the document.

4. A method as claimed in claim 3 including the steps of, during the creation of the signature file, automatically dividing the signature file into a large number of subsets, generating each logical word signature so that it has two components, a physical word signature concatenated to a subset designation field, mapping all logical word signatures having the same subset designation field to the same subset, resulting in the storage in that subset of the physical word signature component of that logical word signature.

5. A method as claimed in claim 4 comprising the steps of, during the creation of the subsets, adding a document identifier, serving to identify the document from which a particular physical word signature or group of physical word signatures is derived, to that physical word signature or group of physical word signatures derived from the same document.

6. A method as claimed in claim 5 wherein the logical word signature is m-bits in length, where m ranges from 8 to 32, and has an n-bit physical word signature concatenated to a subset designation field which selects one of several subsets, where n ranges from 8 to 20.

7. A method as claimed in claim 6 wherein the representation of the document identifiers follows one or more physical word signatures stored within the signature file.

8. A method as claimed in claim 3 wherein the data storage device is a disk, said method comprising the steps of fetching one or more subsets using the data processing means in conjunction with a processor that scans a data stream emanating from said disk looking for pre-specified physical word signatures.

9. A method as claimed in claim 8 wherein each n-bit physical word signature is used as an address for a RAM table with two to the power n locations, where n is an integer ranging from 8 to 20, each location containing one bit, the processor controlled in such a fashion that it ignores physical word signatures when the addressed RAM bit location indicates a word signature of no interest to the query, and places any physical word signature into a FIFO buffer, for future reference, when the addressed RAM bit location contains the complementary bit value, the processor filtering out the physical word signatures of interest.

10. A method as claimed in claim 9 including the steps of, during creation of the signature file, generating a series of groups to make up each subset, each group having a series of physical word signatures, each group being terminated by a representation of a document identifier, each document identifier having a high, middle and low order field, the representation of the document identifier of a first group in the subset actually having a high, middle and low order field, the representations of document identifiers from subsequent groups always having a low order field but only having a middle order field or a high order field in addition to the low order field when necessary to reflect a change or changes in these fields from the document identifier represented in the immediately prior group, the document identifiers being arranged in ascending order.

11. A method as claimed in claim 10 including the steps of, during retrieval of information from the data storage means, using a processor to scan a data stream from the data storage means, the processor pushing all representations of document identifiers having a high order field into the FIFO buffer, the processor saving the last middle order field encountered in the data stream in a register for future use, said last middle order field encountered being inserted into the FIFO buffer along with the low order field that terminates a particular group only if the RAM table has indicated a match between the physical word signature derived from the query keyword and a physical word signature in the particular group.

12. A method as claimed in claim 1 wherein subsets are arranged on the data storage device with free space between consecutive subsets to allow for an increase in size of the subsets as the database is increased in size, said method comprising the steps of increasing the size of the database by adding additional information to the end thereof and in the size of the signature file by adding additional word signature groups at the end of one or more subsets.

13. A method as claimed in claim 12 wherein a logical word signature is to be associated with its corresponding word, the association between the logical word signature and the corresponding word being retained in a word dictionary, the method including the steps of choosing the subset designation field in such a way as to help in maintaining uniform lengths of all subsets and choosing the physical word signatures to ensure a one to one mapping between the logical word signatures and the corresponding word.

14. A method of operating a computer system for storing and retrieving information in a database, said computer system having a processor, a memory with address lines and a FIFO buffer, said processor having an input section, an output section and a control, said method comprising the steps of:
 (i) storing the database in the data storage means;
 (ii) during loading of the database, said system automatically creating for the database a signature file which is divided into subsets, mapping a word signature to a particular subset during creation of the file and storing said signature file subsets on said data storage means;
 (iii) during retrieving, after the signature file is created, entering at least one query word into the system;
 (iv) said system automatically creating a signature for each query word entered into the system;
 (v) in response to a query word, said input section receiving information from said data storage means, said control reviewing said information and sending all word signatures to said address lines of said memory, said memory providing information to the control to enable it to determine whether a particular word signature in the input section matches a signature for said query word if a match occurs,
  (a) the control sending the word signature to said FIFO buffer, the control remembering that a match has occurred and sending the document identifier located subsequent to the matched word signature to the FIFO buffer, the control then moving on to process the next word signature received from the data storage means and so on;

if there is no match, (b) the control ignoring the word signature and moving on to process the next signature word received from the data storage means and so on;

the control thereby effectively being capable of processing several query words in parallel.

* * * * *